United States Patent [19]

O'Shea

[11] Patent Number: 5,121,957
[45] Date of Patent: Jun. 16, 1992

[54] PROTECTOR AND PROCEDURE FOR PROTECTING VEHICLE ACCIDENT VICTIMS AGAINST BROKEN GLASS AND OTHER DEBRIS

[76] Inventor: William F. O'Shea, 40 Susquehanna Ave., Rochelle Park, N.J. 07662

[21] Appl. No.: 640,107

[22] Filed: Jan. 11, 1991

Related U.S. Application Data

[63] Continuation of Ser. No. 423,222, Oct. 18, 1989, abandoned.

[51] Int. Cl.$^5$ .............................................. B60J 9/00
[52] U.S. Cl. .................................. 296/1.1; 296/95.1; 280/749; 160/370.2
[58] Field of Search ................ 296/1.1, 95.1; 280/749; 160/370.2; 150/168; 52/3; 135/115

[56] References Cited

U.S. PATENT DOCUMENTS

| | | | |
|---|---|---|---|
| 608,351 | 8/1898 | Terramorse | 135/115 X |
| 672,731 | 4/1901 | Conley | 135/115 X |
| 1,871,101 | 8/1932 | Waltz | 52/3 X |
| 2,979,129 | 4/1961 | Ketchum | 160/370.2 |
| 3,862,876 | 1/1975 | Graves | 52/3 X |
| 4,171,140 | 10/1979 | Toshihisa | 280/749 |
| 4,590,714 | 5/1986 | Walker | 52/3 |
| 4,790,591 | 12/1988 | Miller | 160/370.2 |
| 4,848,825 | 7/1989 | Niernberger | 296/95.1 |
| 4,961,981 | 10/1990 | Keegan | 52/3 X |

FOREIGN PATENT DOCUMENTS 2740790 3/1979 Fed. Rep. of Germany ..... 296/95.1
1485651 6/1967 France ........................... 296/95.1

Primary Examiner—Margaret A. Focarino
Assistant Examiner—Gary C. Hoge
Attorney, Agent, or Firm—Samuelson & Jacob

[57] ABSTRACT

An accident victim protection procedure and protector protect a vehicle accident victim from shards of glass and other debris generated during rescue and extrication of the victim from a vehicle within which the accident victim is trapped as a result of the accident, the vehicle having at least one glazed window in the form of a windshield, sidelights or a backlight, and surrounding structure, such as a dashboard and a steering column projecting adjacent the dashboard, the protector including a sheet of stowable pliable material which is essentially impervious to the shards of glass and other debris and which is to be deployed over the area of the one glazed window and secured in place between the one glazed window and the victim such that the victim is shielded by the sheet from shards of glass and other debris emanating from the one glazed window and the surrounding structure of the vehicle during rescue and extrication of the victim from the vehicle, and the procedure including deploying and securing the sheet over the area during rescue and extrication of the victim.

11 Claims, 2 Drawing Sheets

PROTECTOR AND PROCEDURE FOR PROTECTING VEHICLE ACCIDENT VICTIMS AGAINST BROKEN GLASS AND OTHER DEBRIS

This is a continuation of application Ser. No. 423,222, filed Oct. 18, 1989, now abandoned.

The present invention relates generally to a rescue procedure and rescue equipment and pertains, more specifically, to an accident victim protector and procedure for use in protecting a vehicle accident victim from shards of glass and other debris generated during rescue operations, and especially during extrication of a victim trapped within a vehicle involved in an accident.

Rescue teams working to remove occupants trapped in a vehicle as a result of an accident often are faced with the problem of gaining access to a victim for extrication without causing further injury. Thus, for example, where a victim is pinned behind the steering wheel of a crashed vehicle, it may become necessary to break away a windshield, or the glass of another glazed window, or to bend or otherwise remove surrounding structural portions of the vehicle, such as the steering column of the vehicle, in order to reach the victim and then extricate the victim from the vehicle. During such rescue operations, the victim must be protected against flying shards of glass and other debris generated as a result of the operations. Often, the victim merely is covered with a blanket, or some other makeshift arrangement, leaving the victim still vulnerable to further injury and promoting a certain lack of confidence on the part of the victim, as well as in the rescuers, at a time when rescuers require confidence and wish to instill confidence, and a corresponding cooperative effort, on the part of the person being rescued. Such confidence generally will expedite the rescue operations, thereby increasing the efficacy of the rescue.

The present invention provides a rescue procedure and a protector for victims of vehicle accidents and accomplishes several objects and advantages, some of which may be summarized as follows: Provides effective protection of a victim of a vehicle accident against further injury from shards of glass and other debris generated as a result of rescue operations during extrication of the victim from the vehicle; expedites rescue operations during the extrication of a victim from a vehicle involved in a vehicle accident, without placing the victim at risk of further injury; shields a vehicle accident victim from the sight of spectators so as to calm the victim during rescue operations; inspires confidence on the part of the victim of a vehicle accident, as well as on the part of rescue workers, for quick and effective rescue operations; provides a relatively simple device which is easily placed into effective use in protecting vehicle accident victims trapped in a vehicle; provides a relatively inexpensive piece of rescue equipment which is easily carried to an accident site and readily deployed for effective use; assures the rescue worker that the victim is protected so as to free the hands of the rescue worker for concentrating on the extricating operations; and enables the widespread economical use of measures which result in quicker, more efficacious rescue operations.

The above objects and advantages, as well as further objects and advantages, are attained by the present invention, which may be described briefly as an accident victim protection procedure and a protector for use in protecting a vehicle accident victim from shards of glass and other debris generated during rescue and extrication of the victim from a vehicle within which the accident victim is trapped as a result of the accident, the vehicle having at least one glazed window in the form of a windshield, sidelights or a backlight, and surrounding structure, such as a dashboard and a steering column projecting adjacent the dashboard, the accident victim protection procedure and protector comprising: providing a sheet of stowable pliable material essentially impervious to the shards of glass and other debris and having a length extending between opposite end edges, and a width extending between opposite side edges, the length and the width defining a perimeter and an area corresponding generally to the perimeter and area of said one glazed window for placement between the one glazed window and the victim; and providing deployment and securing means adjacent at least a portion of the perimeter of the sheet and deploying the sheet over the area of the one glazed window and securing the sheet in place between the one glazed window and the victim such that the victim is shielded by the sheet from shards of glass and other debris emanating from the one glazed window and the surrounding structure of the vehicle during rescue and extrication of the victim from the vehicle.

The invention will be understood more fully, while still further objects and advantages will become apparent, in the following detailed description of a preferred embodiment of the invention illustrated in the accompanying drawing, in which.

Figure 1:
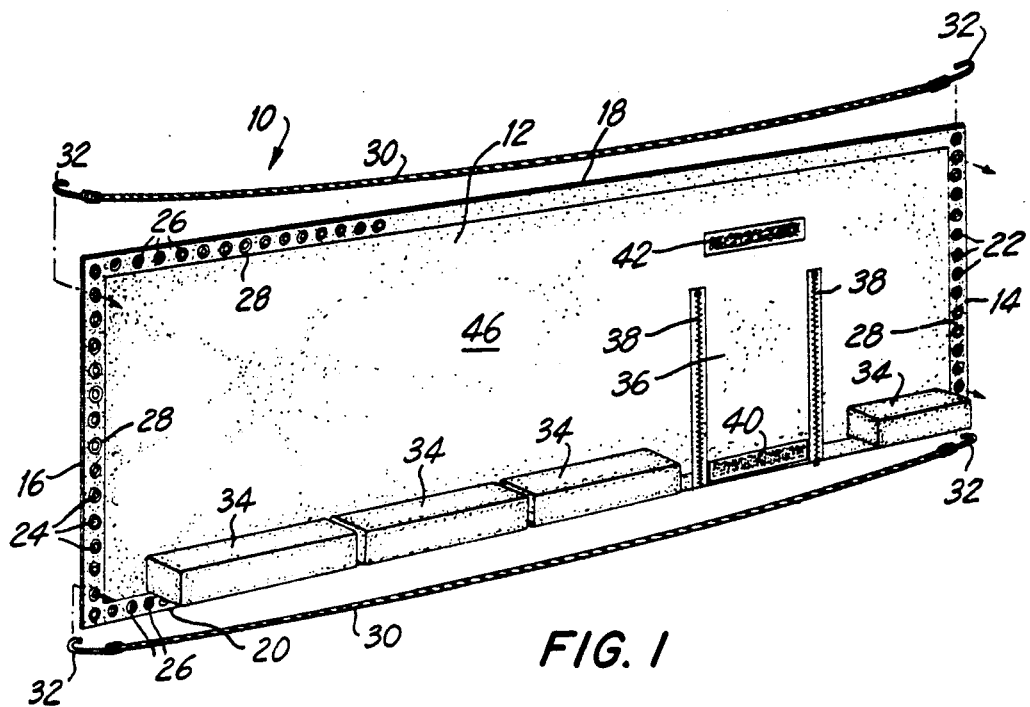
FIG. 1 is a perspective view of an accident victim protector constructed in accordance with the present invention.

Referring now to the drawing, and especially to FIG. 1 thereof, an accident victim protector constructed in accordance with the present invention is illustrated generally 10 and is seen to include a sheet 12 of pliable material, such as a relatively heavy gage sheet of synthetic resin material, a textile material, or synthetic resin impregnated textile material, extending longitudinally between opposite end edges 14 and 16, and laterally between opposite side edges 18 and 20, the end edges 14, 16 and the side edges 18, 20 establishing a longitudinal length, a lateral width, and a perimeter extending around the area of the sheet 12. Deployment and securing means are shown in the form of a plurality of apertures 22 located adjacent the end edge 14 and extending along the width of the sheet 12. Likewise, a similar plurality of apertures 24 are placed adjacent end edge 16. Supplemental apertures 26 are located along lines extending from end edge 16 toward end edge 14 adjacent each side edge 18 and 20, for purposes which will be explained in greater detail below. Preferably, each aperture 22, 24 and 26 is reinforced around the border of the aperture by a grommet 28 secured in the respective aperture.

The deployment and securing means of the protector 10 further includes bands 30 having securing members in the form of hooks 32 affixed to each end of each band 30. The bands 30 are constructed of an elastic material, such as that known as "bungee cord", so that the bands 30 have a self-adjusting length, as will be explained further hereinafter. The number of bands 30 may be varied, depending upon the particular manner in which the sheet 12 will be attached to a vehicle, as explained below. Several weighted pads 34 are integral with the sheet 12 along the lower side edge 20, and the sheet 12 includes a flap 36 contiguous with side edge 20, as show, and maintained within the sheet 12 by laterally extending zipper fasteners 38 at each side of the flap 36. Selectively detachable fasteners in the form of hook-and-loop fastener strips 40 and 42, such as those strips sold under the trademark VELCRO, are secured along a segment of the lower side edge 20 of the sheet 12 and adjacent the upper side edge 18, respectively, on both faces 44 and 46 of the sheet 12 (also see FIG. 3), and zipper fasteners 38 are of the type accessible from either of the faces 44 and 46. The function of the flap 36 will be discussed in detail below.

Figure 2:
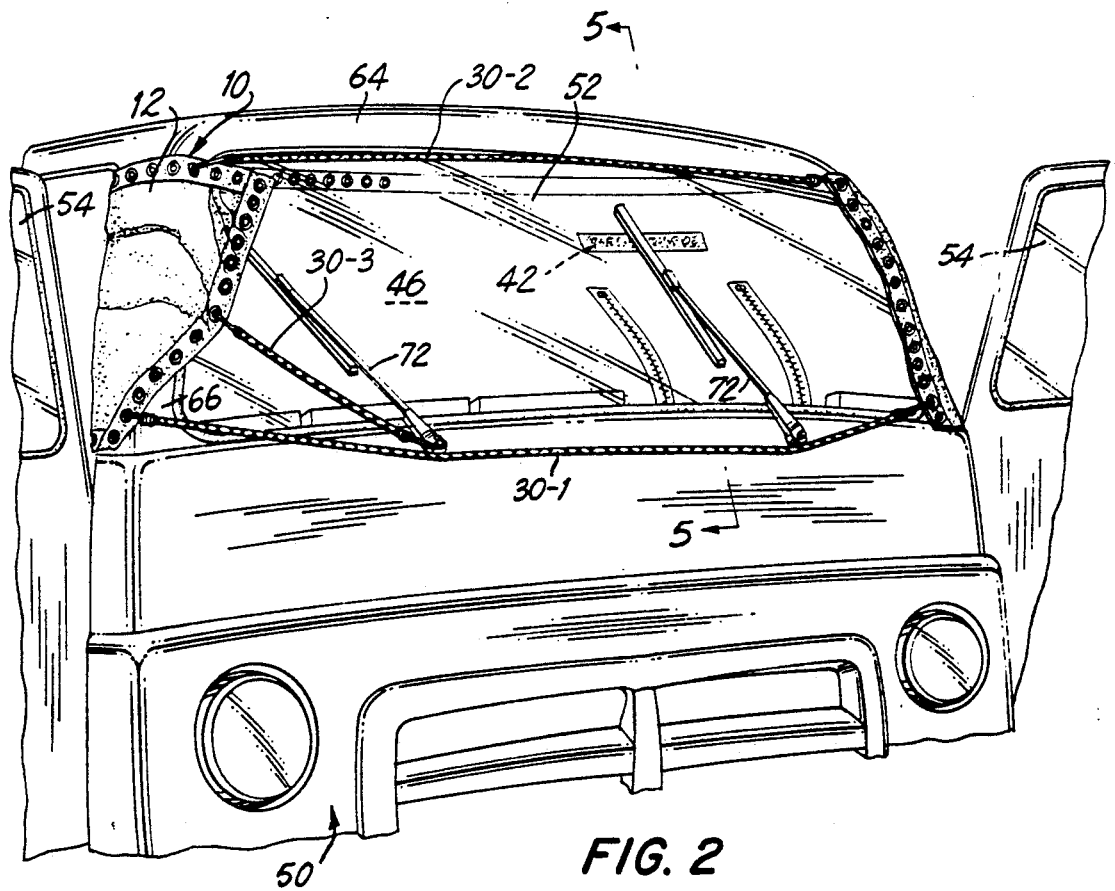
FIG. 2 is a pictorial view of a portion of the exterior of a vehicle showing the protector placed on the vehicle, in accordance with the procedure of the invention.
Figure 3:
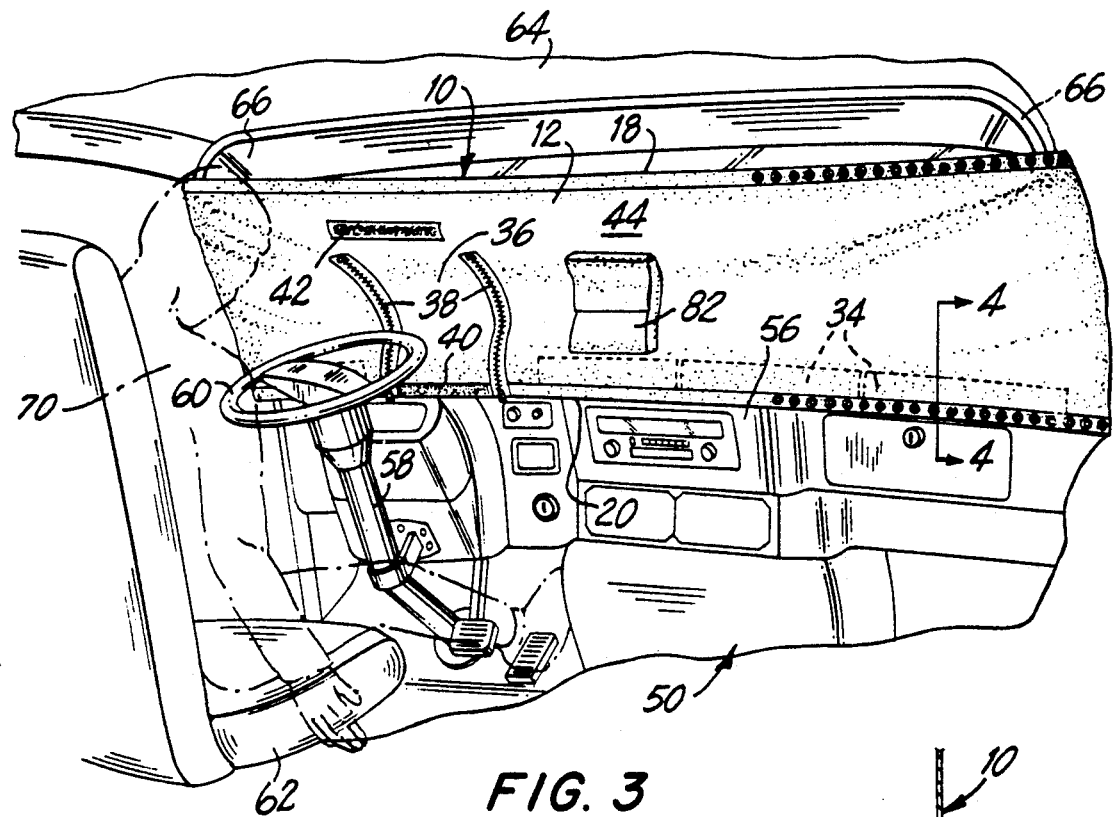
FIG. 3 is a pictorial view of a portion of the interior of the vehicle, with the protector in place in accordance with the invention.

Turning now to FIGS. 2 and 3, a vehicle which has been involved in a vehicle accident is illustrated generally at 50 and is seen to be in the form of a crashed van having several glazed windows which include a windshield 52 and sidelights 54. As in most vans, vehicle 50 includes a backlight, but the backlight is not illustrated. Within the vehicle 50 is a dashboard 56, a steering column 58 projecting beyond the dashboard 56, a steering wheel 60, a seat 62, and a variety of further surrounding structural elements, such as a roof 64 and supporting posts 66. As a result of the vehicle accident, the driver of the vehicle 50 has become an accident victim pinned behind the steering wheel 60 so as to be trapped within the vehicle, as illustrated in phantom at 70. As is the case in very many vehicle accidents, in order to extricate the victim 70, it is necessary to remove the windshield 52 to gain appropriate access to the victim 70. While the preferred procedure would be to remove the windshield 52 as a whole, and thereby avoid breaking the glass of the windshield 52 and scattering shards of glass in the vicinity of the victim 70, with the possibility of concomitant further injury to the victim 70, cutting or breaking of the windshield 52 often is unavoidable, especially where haste is required. It then becomes necessary to protect the victim 70 against flying shards of glass or other debris generated during the rescue operations.

Figure 4:
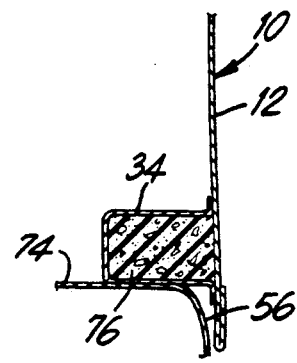
FIG. 4 is an enlarged fragmentary cross-sectional view taken along line 4—4 of FIG. 3.

In order to afford the victim 70 such protection, protector 10 is deployed. Sheet 12 is spread over the windshield 52, inside the vehicle 50, so as to establish a shield between the windshield 52 and the trapped victim 70. The sheet 12 is secured in place by extending an appropriate number of bands 30 along the outside of the vehicle 50 and placing at least some of the hooks 32 of the bands 30 in selected apertures 22, 24 and 26 to hold the sheet 12 relatively taut and in place between the windshield 52 and the victim 70. Thus, as seen in FIG. 2, a lower band 30-1 is hooked into apertures selected from apertures 22 and 24 and extends around windshield wipers 72, while an upper band 30-2 is hooked into an aperture 22 and a selected one of apertures 26 to compensate for the difference in span covered by the lower and upper bands 30-1 and 30-2, respectively. It is noted that the choice provided by apertures 26 enables protector 10 to be adapted to a variety of window shapes and dimensions merely by selecting the appropriate combination of apertures to which the various bands 30 are connected. A supplemental band 30-3 is hooked directly to one of the windshield wipers 72 and to another aperture 24. Supplemental bands, as well as the primary bands, may be hooked to almost any available structural element of the vehicle 50 to accomplish securement and tensioning. All three of the bands 30-1, 30-2 and 30-3 are tensioned by virtue of the elastic nature of the material of the bands 30 so that the bands 30 tend to adjust to the proper length and exert tensioning forces on the sheet 12 tending to maintain the sheet 12 taut, regardless of the selected points of attachment. At the same time, the weighted pads 34 rest upon the cowl 74 of the dashboard 56, as seen in FIG. 4, to enhance isolation of the victim 70 from the windshield 52. Weighted pads 34 include a core 76 of resilient padding so as to fit against the cowl 74 while at the same time maintaining a relatively resilient construction which will not injure either the victim 70 or the rescue workers working with the protector 10.

Figure 5:
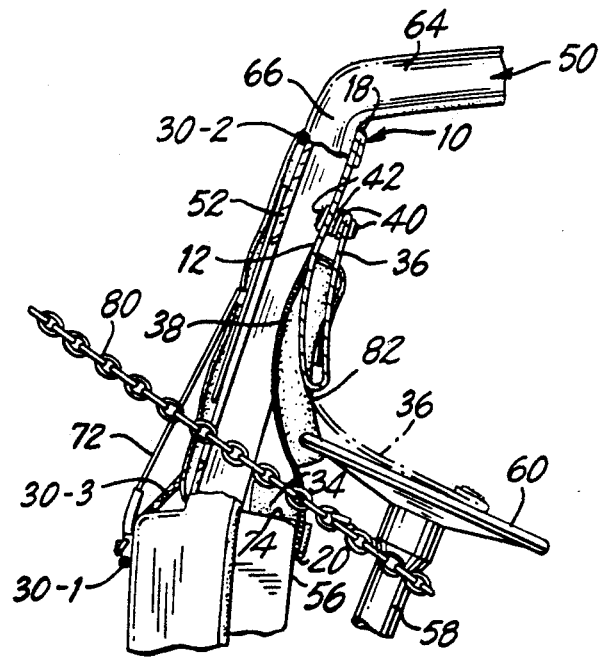
FIG. 5 is a fragmentary cross-sectional view taken along line 5—5 of FIG. 2.

Once the protector 10 is in place, the windshield 52 may be removed. If the windshield 52 is cut or otherwise broken, the material of the sheet 12 will provide a shield impervious to flying shards of glass so that the victim 70 will be protected against further injury. Should it become necessary to pull the steering wheel 60 away from the victim 70 in order to extricate the victim 70, the zipper fasteners 38 are opened to release the flap 36, which flap 36 is juxtaposed with the steering wheel 60 by virtue of the location of the flap 36 more closely adjacent to end edge 14 than to end edge 16, as illustrated in FIGS. 1 through 3, and the flap 36 is folded upwardly, as seen in FIG. 5, to enable access to the steering column 58 through the broken windshield 52 and through the sheet 12. The flap 36 is maintained in the upwardly-folded position by corresponding hook-and-loop fastener elements 40 and 42 until a pull-chain 80 is attached to the steering column 58. Then, the flap 36 may be dropped back to the position shown in phantom in FIG. 5, in which position the flap 36 operates in concert with the remainder of sheet 12 to protect the victim 70 against any debris generated as a result of pulling on the pull-chain 80 to pull the steering wheel 60 away from the victim 70 and free the victim 70 for further extrication procedures. It is noted that the placement of fastener elements 40 and 42 on both faces 44 and 46, and the ability to access zipper fasteners 38 from either face 44 or face 46, enables flap 36 to be operated either from the interior or the exterior of the vehicle 50. A convenient adjunct is provided in the form of a small tool pouch 82 affixed integral with the sheet 12 of protector 10 for containing small tools, such as screwdrivers, pliers, sidecutters, shears and the like, for ready use by rescue workers during the extrication procedure, thereby further expediting the procedure.

Figure 6:
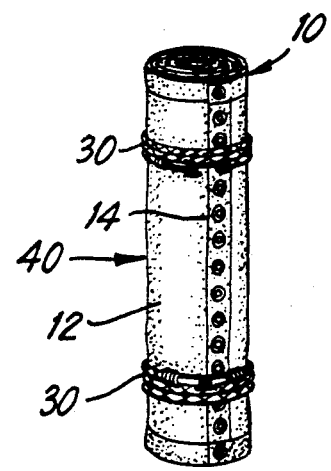
FIG. 6 is a pictorial view, reduced in size, showing the protector wrapped up in condition for stowing and transport.

The material of sheet 12 is chosen for maximum protection of the victim 70 from shards of glass and other debris which may be generated during the above-described rescue operations. Accordingly, the material of sheet 12 must have sufficient strength and resistance to penetration by the objects which otherwise could reach the victim 70 and cause further injury. At the same time, the material must be pliant enough to conform to contours of the vehicle in the vicinity of the window covered by the protector 10, and to be maintained relatively taut over the window. The material of the sheet 12 may itself be somewhat elastic, or may include an elastic panel portion, to facilitate closer conformation of the sheet 12 to the configuration of the vehicle in the vicinity of the window. Numerous synthetic resin materials, textiles and combinations of textile and synthetic resin materials are available for sheet 12 for ready selection by a person of ordinary skill in the choice of materials. Among the preferred materials are heavy duty canvas, duck, nylon, and a synthetic resin material sold under the trademark NOMEX. The preferred material not only provides the requisite strength and pliability, but is opaque so that the victim 70 is shielded visually from the sight of spectators, thereby serving to maintain the victim calm in the presence of excited onlookers. A soft color also aids in relaxing the victim. In addition, the material protects the victim, as well as the rescue worker, against adverse weather conditions. The pliability of the material is such that sheet 12 is limber enough to be folded or otherwise wrapped into a relatively compact configuration, as illustrated in FIG. 6, for ease of stowing and transport. Thus, the sheet 12 is folded readily into a compact package 90 and may even be held in the compact configuration by wrapping at least some of the bands 30 around the folded sheet 12. The construction of protector 10 enables many reuses for a long and reliable service life.

It will be seen that the present invention provides a protection procedure and a protector for vehicle accident victims, which procedure and protector attain the several objects and advantages summarized above, namely: Provides effective protection of a victim of a vehicle accident against further injury from shards of glass and other debris generated as a result of rescue operations during extrication of the victim from the vehicle; expedites rescue operations during the extrication of a victim from a vehicle involved in a vehicle accident, without placing the victim at risk of further injury; shields a vehicle accident victim from the sight of spectators so as to calm the victim during rescue operations; inspires confidence on the part of the victim of a vehicle accident, as well as on the part of rescue workers, for quick and effective rescue operations; provides a relatively simple device which is easily placed into effective use in protecting vehicle accident victims trapped in a vehicle; provides a relatively inexpensive piece of rescue equipment which is easily carried to an accident site and readily deployed for effective use; assures the rescue worker that the victim is protected so as to free the hands of the rescue worker for concentrating on the extricating operations; and enables the widespread economical use of measures which result in quicker, more efficacious rescue operations.

It is to be understood that the above detailed description of a preferred embodiment of the invention is provided by way of example only. Various details of procedure, design and construction may be modified without departing from the true spirit and scope of the invention, as set forth in the appended claims.

The embodiments of the invention in which an exclusive property or privilege is claimed are defined as follows:

1. An accident victim protector for protecting a vehicle accident victim from shards of glass and other debris generated during rescue and extrication of the victim from a vehicle within which the accident victim is trapped as a result of the accident, the vehicle having at least one glazed window in the form of a windshield, sidelights or a backlight, the glazed window having a prescribed perimeter and area, and surrounding structure, including a dashboard and a steering column projecting adjacent the dashboard, the accident victim protector comprising:

a sheet of stowable pliable material essentially opaque and impervious to said shards of glass and other debris and having opposite end edges and a length extending between the opposite end edges, and opposite side edges and a width extending between the opposite side edges, the length and the width defining a perimeter and an area corresponding generally to the prescribed perimeter and area of said one glazed window for enabling placement of the sheet between the one glazed window and the victim;

deployment and securing means adjacent at least a portion of the perimeter of the sheet for deploying the sheet over the prescribed area of the one glazed window and securing the sheet in place between the one glazed window and the victim such that the victim is shielded by the sheet from shards of glass and other debris emanating from the one glazed window and the surrounding structure of the vehicle during rescue and extrication of the victim from the vehicle; and a flap extending through the sheet contiguous with one of the side edges thereof and located more closely adjacent to one of the opposite end edges of the sheet than to the other of the opposite end edges of the sheet for juxaposition with the steering column and for selective movement out of the sheet to open access to the steering column when the sheet is juxtaposed with the windshield of the vehicle such that the steering column will be accessible through the windshield and through the sheet.

2. An accident victim protector for protecting a vehicle accident victim from shards of glass and other debris generated during rescue and extrication of the victim from a vehicle within which the accident victim is trapped as a result of the accident, the vehicle having at least one glazed window in the form of a windshield, sidelights or a backlight, the glazed window having a prescribed perimeter and area, and surrounding structure, including a dashboard and a steering column projecting adjacent the dashboard, the accident victim protector comprising:

a sheet of stowable pliable material essentially opaque and impervious to said shards of glass and other debris and having opposite end edges and a length extending between the opposite end edges, and opposite side edges and a width extending between the opposite side edges, the length and the width defining a perimeter and an area corresponding generally to the prescribed perimeter and area of said one glazed window for enabling placement of the sheet between the one glazed window and the victim; and deployment and securing means adjacent at least a portion of the perimeter of the sheet for deploying the sheet over the prescribed area of the one glazed window and securing the sheet in place between the one glazed window and the victim such that the victim is shielded by the sheet from shards of glass and other debris emanating from the one glazed window and the surrounding structure of the vehicle during rescue and extrication of the victim from the vehicle;

the deployment and securing means including a plurality of weighted pads affixed to the sheet adjacent one of the side edges thereof for resting against the dashboard when the sheet is juxtaposed with the windshield of the vehicle to assist in the deployment and securement of the sheet over the prescribed area of the windshield, the weighted pads each including a core of resilient padding.

3. In combination, a vehicle and an accident victim protector placed so as to protect a vehicle accident victim within the vehicle from shards of glass and other debris generated during rescue and extrication of the victim from the vehicle within which the accident victim is trapped as a result of the accident, the vehicle having at least one glazed window in the form of a windshield, sidelights or a backlight, and surrounding structure, including a dashboard and a steering column projecting adjacent the dashboard, the accident victim protector comprising:

a sheet of stowable pliable essentially opaque material capable of shielding the victim against said shards of glass and other debris and having a length extending between opposite end edges, and a width extending between opposite side edges, the length and the width defining a perimeter and an area corresponding essentially to the perimeter and area of said one glazed window so as to enable placement between the one glazed window and the victim; and deployment and securing means adjacent at least a portion of the perimeter of the sheet for deploying the sheet over the area of the one glazed window and securing the sheet in place between the one glazed window and the victim such that the victim is shielded by the sheet from shards of glass and other debris emanating from the one glazed window and the surrounding structure of the vehicle during rescue and extrication of the victim from the vehicle.

4. The combination of claim 3 wherein the deployment and securing means includes bands of material of self-adjusting length and attachment means for attachment of the bands to the portion of the perimeter of the sheet.

5. The combination of claim 4 wherein the attachment means includes a plurality of apertures in the sheet located along the portion of the perimeter of the sheet for selection of at least one of the plurality of apertures for attachment of at least one of said bands.

6. The combination of claim 5 wherein some of the plurality of apertures are placed in spaced apart locations along the width of the sheet adjacent the opposite end edges thereof.

7. The combination of claim 6 wherein further ones of the plurality of apertures are placed in spaced apart locations along portions of the side edges of the sheet, adjacent at least one of the end edges of the sheet.

8. The combination of claim 3 including a flap in the sheet contiguous with one of the side edges of the sheet and selectively movable out of the sheet for opening access to the steering column such that the steering column will be accessible through the windshield and through the sheet when the sheet is juxtaposed with the windshield of the vehicle.

9. The combination of claim 3 including a plurality of weighted pads affixed to the sheet adjacent one of the side edges thereof for resting against the dashboard when the sheet is juxtaposed with the windshield of the vehicle, the weighted pads each including a core of resilient padding.

10. The procedure for protecting a vehicle accident victim from shards of glass and other debris generated during rescue and extrication of the victim from a vehicle within which the accident victim is trapped as a result of the accident, the vehicle having at least one glazed window in the form of a windshield, sidelights or a backlight, and surrounding structure, including a dashboard and a steering column projecting adjacent the dashboard, the procedure comprising:

providing a sheet of stowable pliable material capable of shielding the victim against said shards of glass and other debris and having a length extending between opposite end edges, and a width extending between opposite side edges, the length and the width defining a perimeter and an area corresponding to the perimeter and area of said one glazed window so as to enable placement between the one glazed window and the victim; and deploying the sheet over the area of the one glazed window and securing the sheet in place between the one glazed window and the victim such that the victim is shielded by the sheet from shards of glass and other debris emanating from the one glazed window and the surrounding structure of the vehicle during rescue and extrication of the victim from the vehicle.

11. The invention of claim 10 including providing a flap in the sheet selectively movable out of the sheet, and moving the flap for opening access to the steering column such that the steering column is accessible through the windshield and through the sheet when the sheet is juxtaposed with the windshield of the vehicle.

* * * * *